US009204403B2

(12) United States Patent
Brueck et al.

(10) Patent No.: US 9,204,403 B2
(45) Date of Patent: Dec. 1, 2015

(54) POWER OVERLOAD CONTROL METHOD USEFUL WITH HIGH SPEED DOWNLINK PACKET ACCESS

(75) Inventors: Stefan Brueck, Nuremberg (DE); Jens Mueckenheim, Nuremberg (DE); Mohammad Ather Khan, Swindon (GB); Patrick Charriere, West Challow (GB)

(73) Assignee: Alcatel Lucent, Boulogne-Billancourt (FR)

( * ) Notice: Subject to any disclaimer, the term of this patent is extended or adjusted under 35 U.S.C. 154(b) by 1427 days.

(21) Appl. No.: 11/614,140

(22) Filed: Dec. 21, 2006

(65) Prior Publication Data
US 2008/0151818 A1    Jun. 26, 2008

(51) Int. Cl.
| | |
|---|---|
| H04B 7/216 | (2006.01) |
| H04W 52/36 | (2009.01) |
| H04W 52/04 | (2009.01) |
| H04W 52/28 | (2009.01) |
| H04W 52/34 | (2009.01) |

(52) U.S. Cl.
CPC ............ H04W 52/367 (2013.01); H04W 52/04 (2013.01); H04W 52/28 (2013.01); H04W 52/281 (2013.01); H04W 52/286 (2013.01); H04W 52/343 (2013.01)

(58) Field of Classification Search
CPC ... H04W 52/367; H04W 52/04; H04W 52/28; H04W 52/281; H04W 52/286; H04W 52/343; H04W 72/0473; H04W 72/10; H04B 1/707
USPC ......... 370/230, 328–330, 431, 437; 455/13.4, 455/450, 464, 522, 552
See application file for complete search history.

(56) References Cited

U.S. PATENT DOCUMENTS

2005/0245266 A1* 11/2005 Viero et al. ................... 455/450
2007/0178927 A1*  8/2007 Fernandez-Corbaton et al. ............. 455/522

FOREIGN PATENT DOCUMENTS

| EP | 1422887 A2 | 5/2004 |
| EP | 1806940 A1 | 7/2007 |

OTHER PUBLICATIONS

"Performance of Link Admission Control in a WCDMA System With HS-DSCH and Mixed Services," Kimmo Hilltunen, Manus Lundevall, Sverker Magnusson, 0-7803-8523/3/04 IEEE, p. 1178-1182.
International Search Report and Written Opinion of the International Searching Authority for International application No. PCT/US2007/025342 mailed May 21, 2008.

* cited by examiner

Primary Examiner — Wayne Cai
(74) Attorney, Agent, or Firm — Carlson, Gaskey & Olds, P.C.

(57) ABSTRACT

An exemplary method of controlling communications that may include high speed downlink packet access (HSDPA) traffic includes setting a first power limit below an allowable power limit. A second power limit is set that is below the first power limit. A determination is made whether there is any HSDPA traffic. The first power limit is selected for non-HSDPA traffic when there is no HSDPA traffic. The second power limit is selected for non-HSDPA traffic when there is HSDPA traffic.

5 Claims, 2 Drawing Sheets

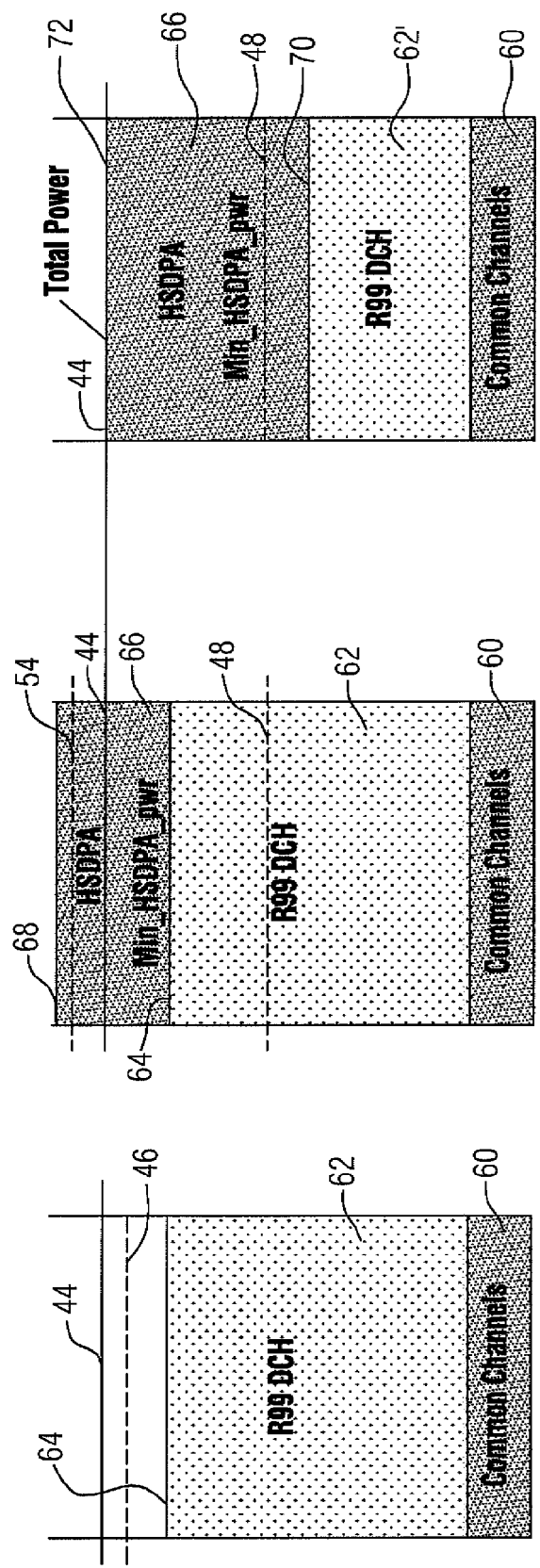

POWER OVERLOAD CONTROL METHOD USEFUL WITH HIGH SPEED DOWNLINK PACKET ACCESS

TECHNICAL FIELD

This invention generally relates to communication. More particularly, this invention relates to wireless communications.

DESCRIPTION OF THE RELATED ART

Wireless communication systems have been used for a variety of purposes. Voice communications have been available for quite some time. More recently, wireless data communications have become popular. With the increased use of such communications, providers have strived to increase data communication possibilities for subscribers.

High speed downlink packet access (HSDPA) is one example feature that provides a more efficient transmission of downlink data to a user than other techniques such as the Release 99 dedicated channel (DCH) channels. For example, HSDPA supports a user data rate of up to 14.4 Mbit/s at the physical layer. HSDPA is designed to transmit data from the packet switched domain, only.

One of the changes with regard to radio resource management for HSDPA compared with previous transmission methods over DCH is the transition of more responsibility for HSDPA resource management from a radio network controller (RNC) to a base station (e.g., NodeB). The main part of the HSDPA resource management in the base station is the HSDPA scheduler. Example schedulers run every transmission time interval, which typically corresponds to every 2 ms. The scheduler at the base station basically performs two tasks. First, the scheduler selects the users and priority queues for transmission in the next transmission time interval. Such selection usually includes using ranking lists that are processed iteratively. Second, the scheduler assigns the transport format and resource combinations to the selected users, including transport block size, the number of HSDPA multi-codes and the modulation format (e.g., QPSK or 16 QAM). Additionally, the scheduler determines the transmit power of the HSDPA physical channels.

Such HSDPA scheduling functionality in a base station offers significantly improved user-perceived throughput and aggregated cell throughput. Additionally, it offers greater flexibility than current DCH load control in an RNC, exclusively. The task for allocating the transmit power to HSDPA is divided between the base station and the RNC. While the HSDPA scheduler of the base station manages the transmit power allocation to the HSDPA users, overload control in the RNC manages the transmit powers for DCH users (e.g., non-HSDPA users). Basically, the transmit power must be managed according to several constraints.

The total transmit power, which is the sum of the power for the common channels, the DCH users and the HSDPA users, should not exceed a total downlink transmit power limit for any significant amount of time. If so, there is an increased risk of power overload that must be limited for protecting amplifiers. When allocating the power resources for HSDPA, the transmit power required for DCH and common channels receives priority. This means that resources available for HSDPA users, and therefore the HSDPA throughput, may be reduced in case of high traffic on the DCH.

There are two main techniques for HSDPA power management; a fixed power reservation technique and a dynamic power allocation technique.

The base station scheduler does not take into account the power resource consumed by DCH and common channels in the fixed power allocation technique. Accordingly, at least the fixed power allocation of the power resource is reserved exclusively for HSDPA transmission according to several principles. The HSDPA scheduler always tries to allocate as much power as it is allowed by a parameter corresponding to the fixed power allocation to the HSDPA users. If there is no HSDPA traffic, DCH users can use all available amplifier power within a prescribed limit. Overload control of DCH users is based on the total transmit power, which includes the power of DCH users and the power of HSDPA users. The basic principle is that admission control will admit a new DCH service request if the total transmit power is less than a threshold selected for controlling the total transmit power. Otherwise the request will be denied. The same mechanisms are applied to the DCH users regardless of whether there is any HSDPA traffic currently active in the cell.

One advantage to the fixed power allocation technique is that it allows for a fixed amount of transmit power to be allocated to HSDPA users. Therefore, HSDPA service can be designed independent of DCH traffic. One drawback is that the fixed HSDPA power has to be relatively limited for avoiding power overload of the system when DCH and HSDPA traffic exist.

In the dynamic power allocation technique, the HSDPA scheduler always tries to allocate all power that has been left over from DCH and common channels to the HSDPA users. Overload control of DCH users is based on the non-HSDPA transmit power, which is based only on the power of DCH users and common channels. Admission control will admit a new DCH service request if the non-HSDPA transmit power is less than a selected threshold. Otherwise, the request is denied. The same mechanisms are applied to DCH users regardless of whether there is any active HSDPA traffic in the cell.

With the dynamic power allocation technique, there is no longer a fixed reservation of power resources to HSDPA users. Instead, the threshold for DCH overload control is used to reserve transmit power resources for HSDPA especially in a high DCH load scenario. By setting the threshold accordingly, it can be possible to ensure that at least some transmit power will be available for HSDPA users. One drawback to this approach is that the DCH traffic must be limited in order to provide a minimum amount of resources to HSDPA users. This can lead to significant under-utilization of the resources by DCH users when there is no active HSDPA traffic in a specific cell.

Another drawback to the dynamic power allocation technique is that a short-term fluctuation in DCH loading, which may occur because of mobility of the users or traffic activity of the DCH service, may lead to an overshoot of the DCH load beyond the set threshold. This scenario results in temporarily reducing HSDPA resources as the base station scheduler will instantaneously reduce HSDPA traffic. After a sufficient amount of time, if the DCH load continues to exceed the threshold, the DCH traffic can be reduced. In the short term, however, HSDPA resources are less than what is otherwise desired.

The fixed power reservation technique or the dynamic power allocation technique have always been used exclusive of each other. It is not known to be possible to switch between them in a dynamic manner, for example. That approach would require an indicator for HSDPA activity in a specific cell. While such an indicator can be achieved within a base station, there is no current HSDPA activity indicator that can be sent from a base station to the RNC, which would be required for deciding whether to switch between the two techniques. Additionally, a special transition method would be needed for situations in which HSDPA users become active in the cell where only DCH users were previously active.

It would be desirable to provide an improved method for allocating resources and serving HSDPA traffic.

SUMMARY

An exemplary method of controlling communications that may include high speed downlink packet access (HSDPA) traffic includes setting a first power limit below an allowable power limit. A second power limit is set that is below the first power limit. A determination is made whether there is any HSDPA traffic. The first power limit is selected for non-HSDPA traffic when there is no HSDPA traffic. The second power limit is selected for non-HSDPA traffic when there is HSDPA traffic.

In one example, the first power limit is a limit on total power and the second limit is a limit on non-HSDPA traffic power.

One example includes allocating at least a minimum HSDPA power for any HSDPA traffic. In one example, more than the minimum HSDPA power can be allocated to any HSDPA traffic if a current non-HSDPA power level is below the allowable power limit by more than the minimum HSDPA power.

In one example, the minimum HSDPA power is greater than a difference between the first power limit and the allowable power limit.

One example includes setting the second power limit and selecting the minimum HSDPA power to achieve a desired relative priority between HSDPA traffic and non-HSDPA traffic. One example includes assigning a higher priority to HSDPA traffic.

The various features and advantages of this invention will become apparent to those skilled in the art from the following detailed description. The drawings that accompany the detailed description can be briefly described as follows.

BRIEF DESCRIPTION OF THE DRAWINGS

FIGS. 3A-3C schematically illustrate different traffic load scenarios.

DETAILED DESCRIPTION

Figure 1:
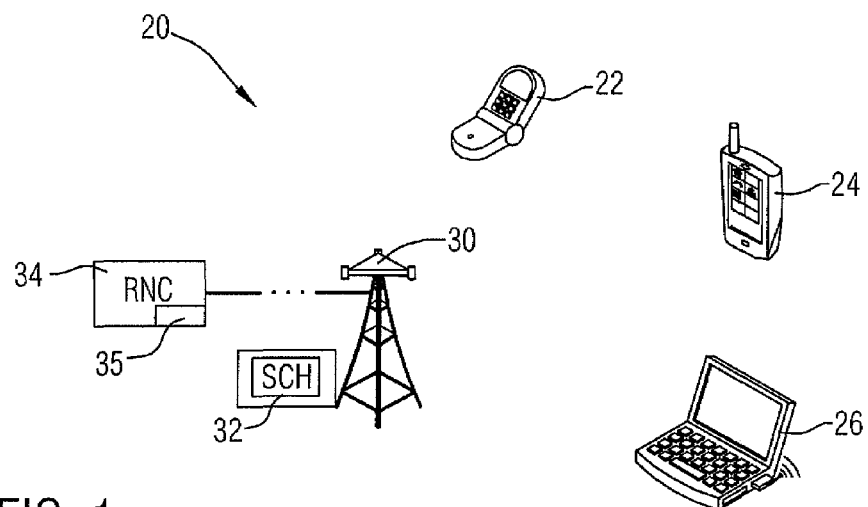
FIG. 1 schematically illustrates selected portions of an example communication system that is useful with an embodiment of this invention.

FIG. 1 schematically shows selected portions of a wireless communication system 20. A plurality of mobile stations 22, 24 and 26 are useful for voice communications, data communications or both. A base station 30 communicates with the mobile stations 22-26 to provide the desired service requested by a user. The base station 30 is capable of providing high speed downlink packet access (HSDPA) services to the example mobile stations.

The base station 30 includes a scheduler 32 that is useful for scheduling users for HSDPA service. The base station 30 also communicates with a radio network controller (RNC) 34. The base station scheduler 32 and the RNC 34 operate in a manner that facilitates scheduling dedicated channel (DCH) data traffic and HSDPA traffic. The illustrated RNC 34 includes a call admission control entity 35 that handles scheduling non-HSDPA traffic.

Figure 2:
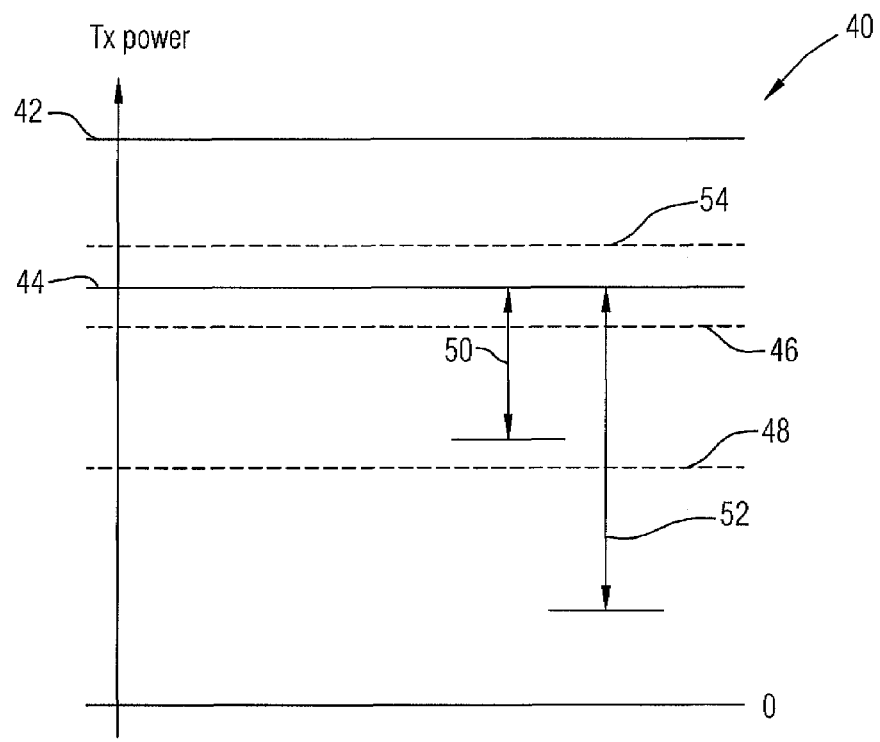
FIG. 2 schematically shows one example power resource allocation technique.

FIG. 2 schematically shows an example transmission power control strategy that is useful for providing HSDPA service. FIG. 2 includes a graphical illustration 40 of a plurality of power values, which correspond to downlink transmit power limits in one example. A maximum total power limit is shown at 42. This corresponds to the maximum total downlink transmit power from the base station 30, for example. An allowable power limit 44 is set below the maximum total power. The allowable power limit 44 is set to protect amplifiers of the base station 30, for example, and to otherwise facilitate a desired level of performance within a corresponding cell.

A first power limit 46 is set below the allowable power limit 44. A second power limit 48 is set below the first power limit 46. Non-HSDPA traffic (e.g., DCH traffic) can consume power resources up to the first power limit 46 when there is no HSDPA traffic. In the event that there is some active HSDPA traffic, the non-HSDPA traffic power cannot exceed the second, lower power limit 48. In one example, the RNC 34 uses a current DCH power and a total power for determining if any HSDPA traffic is active. The RNC 34 then controls the amount of DCH traffic according to the first limit 46 or the second limit 48, responsive to the absence or presence of HSDPA traffic, respectively.

The example of FIG. 2 includes allocating a minimum amount of the power resource for HSDPA traffic. This minimum is shown at 50. The example of FIG. 2 also includes setting a maximum limit on the amount of the available power resource that can be allocated to HSDPA traffic. This maximum amount is schematically shown at 52. The example of FIG. 2 also includes a congestion control limit 54 that is higher than the allowable power limit 44. One reason for having a congestion control limit 54 that exceeds the allowable power limit 44 is that the minimum HSDPA power allocation 50 is greater than a difference between the allowable power limit 44 and the first power limit 46. Accordingly, it is possible for DCH traffic to have a total power at or near the first limit 46 and for new HSDPA traffic to be introduced so that the total power (e.g., the existing DCH power plus the new minimum allocated HSDPA power) will exceed the allowable power limit 44. The congestion control limit 54 allows for bringing the total power back down within an acceptable range under such circumstances.

In the example of FIG. 2, the scheduler 32 can use the entire minimum HSDPA power 50 regardless of the allowable power limit 44. Accordingly, the scheduler 32 may allocate the HSDPA power in such a way that for a short time period more total transmit power is used than that allowed for by the allowable power limit 44. Under such circumstances, there may be a short duration of power overload in the system. In one example, when the amount of available transmit power is greater than or equal to the minimum HSDPA power 50, the scheduler will allocate all remaining power up to the limit 52.

The congestion control limit 54 ensures a recovery from a power overload condition in the event that the total transmit power exceeds the threshold 54. Under such a circumstance, the offered traffic for DCH users is reduced to reduce the total transmit power so that it will be below the threshold 54. In one example, congestion control techniques include reducing the data rate of a selected number of PS users over DCH. Another example includes initiating a handover of some DCH calls to another frequency or to GSM, for example. The congestion control may interact with a physical layer function that is triggered when a total transmit power exceeds the allowable power limit 44 for a short duration. Such functionality is useful for protecting the power amplifier of the base station 30 from overload by reducing the transmit power of the users and reducing short-term quality of the transmission. The congestion control threshold 54, therefore, provides long-term overload handling to avoid long-term quality degradation.

The various power limits shown in FIG. 2 are useful for admission control to maintain a total power level within the allowable power limit 44 while providing at least some HSDPA service. At least one of the first limit 46 or the second limit 48 is useful during admission control for deciding whether to grant or reject a service request on DCH.

When a total transmit power is below the first power limit 46, a service request for a user on DCH can be admitted regardless of the status of the non-HSDPA transmit power. Under such circumstances, there is no active HSDPA traffic or the scheduler 32 has not allocated all available power to HSDPA traffic (e.g., there may be a low amount of HSDPA traffic). Under this circumstance, there is sufficient power available for the new DCH user with low risk that the total transmit power will exceed the allowable power limit 44.

FIG. 3A shows one such example scenario. A portion of the available power resource is consumed by common channels as shown at 60. Non-HSDPA users (e.g., R99 DCH users) eon-sum-et-consume another portion of the available power resource shown at 62. The total transmit power in FIG. 3A is shown at 64. Because this total is below the first power limit 46, it is possible to add a new DCH user with a low risk that the total power 64 will exceed the allowable power limit 44.

In FIG. 3A, for example, there is no active HSDPA traffic because there is no difference between the total transmit power 64 and the non-HSDPA traffic power (e.g., the consumption at 60 and 62 equals the total 64).

FIG. 3B shows a change in the scenario from FIG. 3A. In FIG. 3B, HSDPA traffic has begun and at least the minimum HSDPA power allocation results in a consumption of available power resource shown at 66. In this example, the total transmit power 68 is above the allowable power limit 44 because the total non-HSDPA power (e.g., the power level shown at 64) was already relatively high and close to the allowable power limit 44. The higher total transmit power 68 than the non-HSDPA traffic power shown at 64 indicates the presence of the HSDPA traffic.

In FIG. 3B, the system is in downlink power overload and the total transmit power must be reduced. In this example, the total power 68 is also above the congestion control threshold 54 and congestion control, implemented by the RNC 34, reduces the DCH traffic. For example, the data rate of at least some selected DCH users may be reduced to reduce the power consumption shown at 62 to the amount 62' shown in FIG. 3C.

FIG. 3C shows a correction in the total power after some time compared to the introduction of HSDPA traffic in FIG. 3B. Once the DCH power consumption at 62' is achieved, the total non-HSDPA power is at a level shown at 70. In the example of FIG. 3C, the total non-HSDPA power at the level 70 is maintained below the second power limit 48. Whenever there is HSDPA traffic present, the second power limit 48 is selected as the threshold beneath which the total non-HSDPA power should be maintained. Accordingly, admission control will keep the non-HSDPA transmit power on average below the second power limit 48. By reasonably setting the second power limit 48, the minimum amount of HSDPA power 50 is mostly available for HSDPA users and there is only a low probability that the total power 70 will exceed the allowable power limit 44. The total transmit power 72 in the example of FIG. 3C corresponds to the allowable power limit 44.

Some of the features of the example load control techniques are implemented by the scheduler 32. For example, the scheduler 32 sets the allowable power limit 44, which the total power shall exceed only temporarily and infrequently. The scheduler 32 normally assigns the HSDPA power according to this limit. The allowable power limit 44 is kept below the maximum power 42 to protect the amplifier of the base station 30. In other words, the allowable power limit 44 of the illustrated example sets a long-term amplifier power below a short-term maximum power, which may reach the maximum power 42.

The scheduler 32 in one example sets the minimum HSDPA power 50, which HSDPA users are assigned whenever there is HSDPA traffic. The minimum HSDPA power 50 is set below the allowable power limit 44 because a certain amount of transmit power must be given to common channels and to some extent to dedicated channels.

In one example, the minimum HSDPA power allocation 50 is set to zero. In such an example, the scheduler 32 essentially performs consistent with a pure dynamic allocation technique.

The maximum HSDPA power allocation 52, which is provided by the RNC 34 through NBAP signaling to the base station 30 in one example, provides a limit on the maximum amount of the power resource that the scheduler 32 will assign to HSDPA users. This threshold can be set in various ways to achieve a desired effect on the operation of the scheduler 32. For example, if the maximum HSDPA power 52 is set above the allowable power limit 44, the maximum HSDPA power parameter has no effect on the operation of the system. The other operation parameters limit the HSDPA power usage so that it is always below the maximum possible power 42.

If the maximum HSDPA power 52 is set to be greater than the minimum HSDPA power 50, the scheduler 32 will allocate the HSDPA power between the two thresholds 50 and 52. Such a setting of the maximum HSDPA power 52 allows an operator to limit HSDPA power utilization within the boundaries 50 and 52.

If the maximum HSDPA power 52 is set less than or equal to the minimum HSDPA power 50, the maximum HSDPA power 52 takes precedence over all other settings. Under this circumstance, the scheduler 32 will allocate power as if it were using a fixed allocation technique with the maximum power 52 being the fixed amount.

In the illustrated example, the allowable power limit 44 and the minimum HSDPA power allocation 50 are base station specific parameters. The maximum power limit 42 and the maximum HSDPA power allocation 52 are provided from the RNC 34 via NBAP signaling to the base station 30.

The load control thresholds of the RNC 34 are parameters that can be set in the RNC 34 and will be used to generate the associated measurement events and to trigger the corresponding action responsive to the occurrence of the measurement event. In one example, the RNC load control threshold parameters include having the congestion control threshold 54 at a level greater than or equal to the allowable power limit 44. This ensures that congestion control will only reduce the DCH traffic, when the scheduler 32 is not able to maintain the total power within the allowable power limit 44. Furthermore, setting the congestion control limit 54 this way allows a hysteresis in that congestion control is not triggered at every short-time overshot but only on longer term power overload. On the other side, the congestion control limit 54 is set relatively close to the allowable power limit 44 so that there is a high likelihood that congestion control will reduce the total power below the allowable power limit 44.

The first power limit 46 is set at or below the allowable limit 44. This specific setting of the first power limit 46 provides an indicator that HSDPA is active in the specific cell and the HSDPA scheduler 32 is able to allocate all remaining power up to the allowable power limit 44. Moreover, the first power limit 46 determines the limit of average DCH power utilization when no HSDPA users are active in the cell.

The second power limit 48 is set to be less than or equal to the first power limit 46. In particular, the second power limit 48 determines the limit of average DCH power utilization when HSDPA users are active in the cell.

Selecting the second power limit 48 and the minimum HSDPA power allocation 50 allows for assigning relative priorities for power resource assignment. For example, when the second power limit 48 is kept less than or equal to a difference between the allowable power limit 44 and the minimum HSDPA power allocation 50, the amount of transmit power for the HSDPA users can be determined. A low setting of the second power limit 48 will reserve more power for HSDPA traffic, while less power will be available for DCH traffic. Setting the second power limit 48 relatively higher will allow more power for DCH traffic.

If the second power limit 48 is set higher than the difference between the allowable power limit 44 and the minimum HSDPA power allocation 50, that provides a more aggressive call admission control scheme, in which the probability of going above the allowable power limit is increased. This implies more frequent trigger of congestion control to reduce DCH traffic after admitting the new HSDPA service.

If the second power limit 48 is set equal to the first power limit 46, the resulting power control approach emulates the load control associated with a fixed power allocation technique.

In one example, different values for the first and second power limits 46 and 48 are used for different DCH data rates. In one example, there are a plurality of first and second power limits for a plurality of DCH data rates. One example includes a different first and second power limit for each DCH data rate. Another example associates a single first and second power limit set with a plurality of DCH data rates that are relatively close to each other or within a selected range of each other.

One example that includes multiple first and second power limits includes at least one other technique to reduce the number of sets of first and second power limits. One such technique includes associating a first power limit 46 and a corresponding second power limit 48 with a plurality of relatively low data rates that are not much different. For example, it may be reasonable to apply the same threshold for data rates of 64 kbps, 32 kbps and lower.

Another technique includes specifically setting the minimum HSDPA power 50 together with the requests for different data rates. This technique makes it possible to reuse the second power limit 48 to provide the admission criterion for a high rate DCH service. For example, the criterion described above can be enhanced to admit a high data rate DCH service (e.g. 384 kbps), when the total transmit power is less than the first power limit 46 and the non-HSDPA power is less than the second power limit 48. In this case HSDPA traffic is either not active or the HSDPA scheduler is not able to allocate all available power to HSDPA traffic (e.g., there is a low amount of HSDPA traffic). Then, there are sufficient resources available even for the high data rate (e.g., 384 kbps) DCH user. One example includes restricting the usage of high DCH data rates to cells without HSDPA activity. For example, the operator may not want to allow new calls with 384 kbps on DCH, when HSDPA is active. In this case no special HSDPA threshold for this service is needed. In one example, when a high data rate DCH service is active without HSDPA, this will be likely downgraded to a lower data rate if HSDPA traffic becomes active as described above and shown schematically in FIGS. 3b and 3c.

The disclosed examples have several advantages. It is possible for HSDPA traffic to have a higher priority than DCH traffic. In some examples, DCH users will be downgraded in their data rate in order to guarantee the minimum HSDPA power allocation to the HSDPA users. HSDPA traffic can consume all unused resources that are leftover from DCH up to any maximum HSDPA power allocation limit. This will improve throughput compared to a fixed allocation technique in case more resources are available than given by the minimum HSDPA power allocation. In a case of no HSDPA traffic, the DCH traffic can go up to the first power limit, which allows better utilization in this scenario than using a threshold closer to the second power limit as is needed when there is HSDPA traffic. This is different from the dynamic allocation technique, which only used one relatively low threshold regardless of whether there was HSDPA traffic.

Strategically setting the second power limit and the minimum HSDPA power allocation allows an operator to adjust the relative priorities of the transmit power assignment between DCH and HSDPA users. The disclosed examples are more flexible than the pure allocation methods given by the 3GPP standards, which always prioritize DCH over HSDPA. In particular, the operator is now able to give some priority of HSDPA over DCH in the transmit power assignment.

When it is desired, the disclosed example parameters can be tuned to achieve operation that emulates a pure fixed or pure dynamic power allocation technique. There is no need for a separate indicator regarding HSDPA activity of the cell, however. The decision regarding whether there is active HSDPA traffic is derived in one example from comparing the total power measurements and the non-HSDPA power measurements.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of controlling communications that may include high speed downlink packet access (HSDPA) traffic, comprising the steps of:
    setting a first power limit and a second power limit, the first power limit being below an allowable power limit, the second power limit being below the first power limit;
    determining whether there is any HSDPA traffic;
    using a controller for selecting one of the first power limit or the second power limit, the controller selecting the first power limit for non-HSDPA traffic when there is no HSDPA traffic and the controller selecting the second power limit for non-HSDPA traffic when there is HSDPA traffic;
    allocating at least a minimum HSDPA power to any HSDPA traffic; and
    allocating more than the minimum HSDPA power to any HSDPA traffic if a current non-HSDPA power level is below the allowable power limit by more than the minimum HSDPA power;
    wherein the minimum HSDPA power is greater than a difference between the first power limit and the allowable power limit.

2. A method of controlling communications that may include high speed downlink packet access (HSDPA) traffic, comprising the steps of:
    setting a first power limit and a second power limit, the first power limit being below an allowable power limit, the second power limit being below the first power limit;
    determining whether there is any HSDPA traffic;
    using a controller for selecting one of the first power limit or the second power limit, the controller selecting the first power limit for non-HSDPA traffic when there is no HSDPA traffic and the controller selecting the second power limit for non-HSDPA traffic when there is HSDPA traffic;
    using at least one of the first or second power limit as a threshold for considering any new non-HSDPA service request; and
    granting a service request for a non-HSDPA user whenever a current total power is at least equal to the first power limit and a current non-HSDPA power is less than the second power limit.

3. A method of controlling communications that may include high speed downlink packet access (HSDPA) traffic, comprising the steps of:
    setting a first power limit and a second power limit, the first power limit being below an allowable power limit, the second power limit being below the first power limit;
    determining whether there is any HSDPA traffic;
    using a controller for selecting one of the first power limit or the second power limit, the controller selecting the first power limit for non-HSDPA traffic when there is no HSDPA traffic and the controller selecting the second power limit for non-HSDPA traffic when there is HSDPA traffic;
    using at least one of the first or second power limit as a threshold for considering any new non-HSDPA service request; and
    denying a service request for a non-HSDPA user whenever a current total power is at least equal to the first power limit and a current non-HSDPA power is at least equal to the second power limit.

4. A method of controlling communications that may include high speed downlink packet access (HSDPA) traffic, comprising the steps of:
    setting a first power limit and a second power limit, the first power limit being below an allowable power limit, the second power limit being below the first power limit;
    determining whether there is any HSDPA traffic;
    using a controller for selecting one of the first power limit or the second power limit, the controller selecting the first power limit for non-HSDPA traffic when there is no HSDPA traffic and the controller selecting the second power limit for non-HSDPA traffic when there is HSDPA traffic;
    setting a plurality of the first power limits, wherein each of the first power limits corresponds to at least one non-HSDPA data rate;
    setting a corresponding plurality of the second power limits;
    associating each of the second power limits with a corresponding one of the first power limits; and
    granting a service request for a high data rate non-HSDPA user having a data rate that exceeds a selected threshold if a current total transmit power is less than one of the first power limits and a current non-HSDPA power is less than a corresponding one of the second power limits.

5. A method of controlling communications that may include high speed downlink packet access (HSDPA) traffic, comprising the steps of:
    setting a first power limit and a second power limit, the first power limit being below an allowable power limit, the second power limit being below the first power limit;
    determining whether there is any HSDPA traffic;
    using a controller for selecting one of the first power limit or the second power limit, the controller selecting the first power limit for non-HSDPA traffic when there is no HSDPA traffic and the controller selecting the second power limit for non-HSDPA traffic when there is HSDPA traffic;
    setting a plurality of the first power limits, wherein each of the first power limits corresponds to at least one non-HSDPA data rate;
    setting a corresponding plurality of the second power limits;
    associating each of the second power limits with a corresponding one of the first power limits; and
    granting a service request for a high data rate non-HSDPA user having a data rate that exceeds a selected threshold only if there is no current HSDPA traffic in an associated cell.

* * * * *